(12) United States Patent
Kiyosawa

(10) Patent No.: US 7,484,436 B2
(45) Date of Patent: Feb. 3, 2009

(54) WAVE GEAR DEVICE

(75) Inventor: Yoshihide Kiyosawa, Nagano (JP)

(73) Assignee: Harmonic Drive Systems, Inc., Tokyo (JP)

( * ) Notice: Subject to any disclaimer, the term of this patent is extended or adjusted under 35 U.S.C. 154(b) by 340 days.

(21) Appl. No.: 10/587,004

(22) PCT Filed: Apr. 15, 2004

(86) PCT No.: PCT/JP2004/005426

§ 371 (c)(1),
(2), (4) Date: Jul. 20, 2006

(87) PCT Pub. No.: WO2005/100818

PCT Pub. Date: Oct. 27, 2005

(65) Prior Publication Data

US 2007/0157760 A1  Jul. 12, 2007

(51) Int. Cl.
*F16H 35/00* (2006.01)
(52) U.S. Cl. .......................... 74/640; 475/162; 184/6.12
(58) Field of Classification Search .................. 74/640; 475/162; 184/5, 6.12
See application file for complete search history.

(56) References Cited

U.S. PATENT DOCUMENTS 3,435,705 A * 4/1969 Musser ........................ 74/640
3,642,331 A   2/1972 Silver
5,061,227 A * 10/1991 Fickelscher .................. 475/170
5,772,573 A *  6/1998 Hao ............................. 494/15
5,984,048 A * 11/1999 Kiyosawa et al. ........... 184/6.12
6,682,220 B2 * 1/2004 Kobayashi .................. 384/447

FOREIGN PATENT DOCUMENTS

| JP | SHO50-12066 | 8/1975 |
| JP | 03-39621 | 4/1991 |
| JP | 2002-349645 | 12/2002 |

* cited by examiner

*Primary Examiner*—David D. Le
(74) *Attorney, Agent, or Firm*—Flynn, Thiel, Boutell & Tanis, P.C.

(57) ABSTRACT

A wave gear device, wherein, when a wave generator is in a low speed rotating state, a rolling bearing state is formed by a wave bearing and the wave generator and a flexible external gear are held in a relatively rotatable state and when the wave generator is in a high speed rotating state, partition pieces and split side plate pieces forming the retainer of the web bearing are displaced to the outside to stop the rotation of balls in their axes and the revolution thereof. Accordingly, a sliding bearing state is formed by lubricating oil film formed between the wave generator and the flexible external gear and the wave generator and the flexible external gear are held in a relatively rotatable state.

12 Claims, 4 Drawing Sheets

WAVE GEAR DEVICE

TECHNICAL FIELD

The present invention relates to a wave gear device that can handle high speed rotations suitable for use in reducing the high speed output rotations of a gas turbine or other high-speed power sources.

BACKGROUND ART

A typical wave gear device comprises an annular rigid internal gear, an annular flexible external gear coaxially disposed inside the rigid internal gear, and an elliptically contoured wave generator fitted inside the flexible external gear. The flexible external gear is elliptically flexed by the wave generator, and meshes with the rigid internal gear at the two ends of the elliptical shape in the direction of the major axis. The two gears have a tooth number difference of 2n teeth (where n is a positive integer). Therefore, when the wave generator is rotated by a motor or another rotational drive source, the meshing location of the two gears moves in the circumferential direction, and a relative rotation corresponding to the tooth number difference is generated in the two gears. The rigid internal gear is usually fixed in place, and considerably reduced rotations are output from the flexible external gear.

A wave generator comprises a rotating input shaft connected to a motor or another output shaft, an elliptically contoured rigid plug coaxially mounted on the rotating input shaft, and a wave bearing mounted on the external peripheral surface of the rigid plug. The wave bearing comprises a thin flexible outer ring and inner ring, the inner ring is mounted on the elliptical external peripheral surface of the rigid plug so as to rotate in an integral fashion, and the outer ring is pressed by the rigid plug to the internal peripheral surface of the flexible external gear.

The flexible external gear rotates in a state of being elliptically flexed by the wave generator. Therefore, the frictional resistance exerted on the wave bearing during rotation increases in comparison with the case of perfectly circular rotation. In view of the above, wave bearings are usually ball bearings whose rolling friction resistance in less than that of bearings provided with rolling elements having a roller shape or another shape.

Here, problems such as the following occur when a wave generator provided with ball bearings is rotated at high speed.

(1) The rolling fatigue life of the balls is reduced because of an increase in the number of rolls performed by the ball-bearing balls per unit of time.

(2) Agitation resistance produced by a lubricant on the ball bearings increases, and the heat output increases in association with the agitation. As a result, the sliding portion of the ball bearings is insufficiently lubricated, and the life of the ball bearings is reduced.

(3) The centrifugal force exerted on the balls increases because the orbital speed of the ball-bearing balls increases. The centrifugal force exerted on the balls is particularly increased in large-sized ball-bearing balls. As a result, the rolling fatigue life of the balls is reduced because a considerable load is applied to the outer ring in particular. For this reason, the maximum rotational speed is kept low in large wave gear devices in particular.

In this manner, the life of the wave bearing and other factors impose limits in a wave gear device, making the wave gear device unsuitable for use as a speed reduction device for a gas turbine or other high-speed rotational device. Also, the wave gear device can be used as a speed-increasing device, but the limit of the maximum rotational speed is low and application as a speed-increasing device is therefore limited.

DISCLOSURE OF THE INVENTION

In view of the above, an object of the present invention is to provide a wave gear device that is suitable of use as a speed reduction device for a high-speed rotational device.

Another object of the present invention is to provide a wave gear device that is suitable for use as a speed-increasing device.

In the wave gear device of the present invention, rolling produced by a wave bearing is used during low-speed rotation so that the wave generator and the flexible external gear can rotate relative to each other. Also, the wave bearing is restrained so as to rotate integrally with the rigid plug of the wave generator and to make use of fluid lubrication produced by an oil film or gaseous film during high-speed rotation, wherein a sufficient oil film or gaseous film is formed between the external peripheral surface of the outer ring of the wave bearing and the internal peripheral surface of the flexible external gear.

When a bearing mechanism designed to hold the wave generator and flexible external gear while allowing them to rotate relative to each other is configured in this manner, rolling fatigue does not occur because the rolling elements of the wave bearing do not rotate during high-speed rotation. Also, rolling fatigue of the outer ring and other components commonly caused by centrifugal force acting on the rolling elements does not occur because the rolling elements do not rotate or revolve. Furthermore, the life of the ball bearings due to inadequate lubrication can be prevented from being reduced because the generation of heat due to considerable agitation resistance produced by the lubricant can be reduced. On the other hand, the relative sliding velocity between the wave generator and the flexible external gear is low during low-speed rotation. Therefore, an adequate oil film or gaseous film is not formed therebetween, and a sliding bearing state cannot be formed. In the present invention, a rolling bearing state produced by the wave bearing is formed in a conventional manner because the wave bearing is unrestrained during low-speed rotation.

More specifically, the wave gear device of the present invention comprises:

an annular rigid internal gear;

an annular flexible external gear disposed inside the rigid internal gear;

a wave generator for flexing the flexible external gear in the radial direction to cause partial meshing with the rigid internal gear, and causing the meshing location of the two gears to rotate in the circumferential direction; and a bearing mechanism for holding the flexible external gear and the wave generator while allowing the gear and the generator to rotate relative to each other, wherein the bearing mechanism reversibly switches between a rolling bearing state produced by rolling elements, and a sliding bearing state produced by an oil film or another fluid lubrication film, in accordance with the rotational speed of the wave generator.

In this case, the wave generator comprises a rigid plug and rolling bearings; and the rolling bearing comprises an inner ring fitted to the external peripheral surface of the rigid plug, an outer ring in contact with the internal peripheral surface of the flexible external gear via a fluid lubrication film, and rolling elements mounted between the inner ring and outer ring.

The bearing mechanism comprises the rolling bearings, the fluid lubrication film, and a restraining member for restraining the rolling bearings so as to integrally rotate together with the rigid plug when the rotational speed of the wave generator reaches a prescribed rotational speed or higher.

A retainer that holds the rolling elements in the rolling bearing can be used as the restraining member. In this case, at least a portion of the location of the retainer may be displaced outward in the radial direction by centrifugal force exerted on the retainer in association with an increase in the rotational speed of the wave generator, and a state of contact with the outer ring and/or the rolling elements may be formed.

The location of the retainer may be displaced inward in the radial direction by an elastic return force, and a state of separation from the outer ring and/or the rolling elements may be formed when the rotational speed of the wave generator decreases.

The surface in frictional contact with the outer ring and/or the rolling elements at the location of the retainer is preferably a high-friction surface having a high friction coefficient in comparison with other portions of the retainer.

To perfectly switch from a rolling bearing state to a sliding bearing state, the frictional contact resistance generated between the retainer and the outer ring and/or the rolling elements may be set greater than the frictional contact resistance generated between the external peripheral surface of the outer ring and the internal peripheral surface of the flexible external gear when the wave generator reaches a prescribed rotational speed or higher.

Next, the restraining member may be a member that is mounted in a radially moveable state with respect to the rigid plug or the inner ring, that moves outward in the radial direction by centrifugal force exerted on the restraining member in association with the rotation of the wave generator, and that shifts to a state of contact with the outer ring and/or the rolling elements.

In this case as well, the restraining member may be configured to move inward in the radial direction by an elastic return force, and to shift to a state of separation from the outer ring and/or the rolling elements when the rotational speed of the wave generator decreases.

Also, the surface in frictional contact with the outer ring and/or the rolling elements in the restraining member is preferably a high-friction surface having a high friction coefficient in comparison with other portions of the restraining member.

The frictional contact resistance generated between the restraining member and the outer ring and/or the rolling elements preferably becomes greater than the frictional contact resistance generated between the external peripheral surface of the outer ring and the internal peripheral surface of the flexible external gear when the wave generator reaches a prescribed rotational speed or higher.

Ball bearings with a low rolling friction resistance are preferably used as the rolling bearings of the wave generator.

| (Symbols) | |
|---|---|
| 1, 1A | wave gear device |
| 2 | rigid internal gear |
| 24 | internal teeth |
| 3 | flexible external gear |
| 3a | internal peripheral surface portion |
| 34 | external teeth |
| 4 | wave generator |
| 41 | input shaft |
| 42 | rigid plug |
| 43 | wave bearing |
| 44 | inner ring |
| 45 | outer ring |
| 45a | external peripheral surface of the outer ring |
| 46 | balls |
| 47 | retainer |
| 5 | elastic ring |
| 7 | partition piece |
| 8 | split side plate pieces |
| 81 | main body member |
| 82 | frictional contact member |
| 82a | frictional contact surface |
| 9 | lubrication oil film |
| 10 | restraining member |
| 11 | restraining plate |
| 11b | main body member |
| 11c | frictional contact member |
| 11d | frictional contact surface |
| 11e | guide holes |
| 12 | elastic ring |
| 13 | guide pin |

BEST MODE FOR CARRYING OUT THE INVENTION

A wave gear device in which the present invention has been applied is described below with reference to the drawings.

Figure 1:
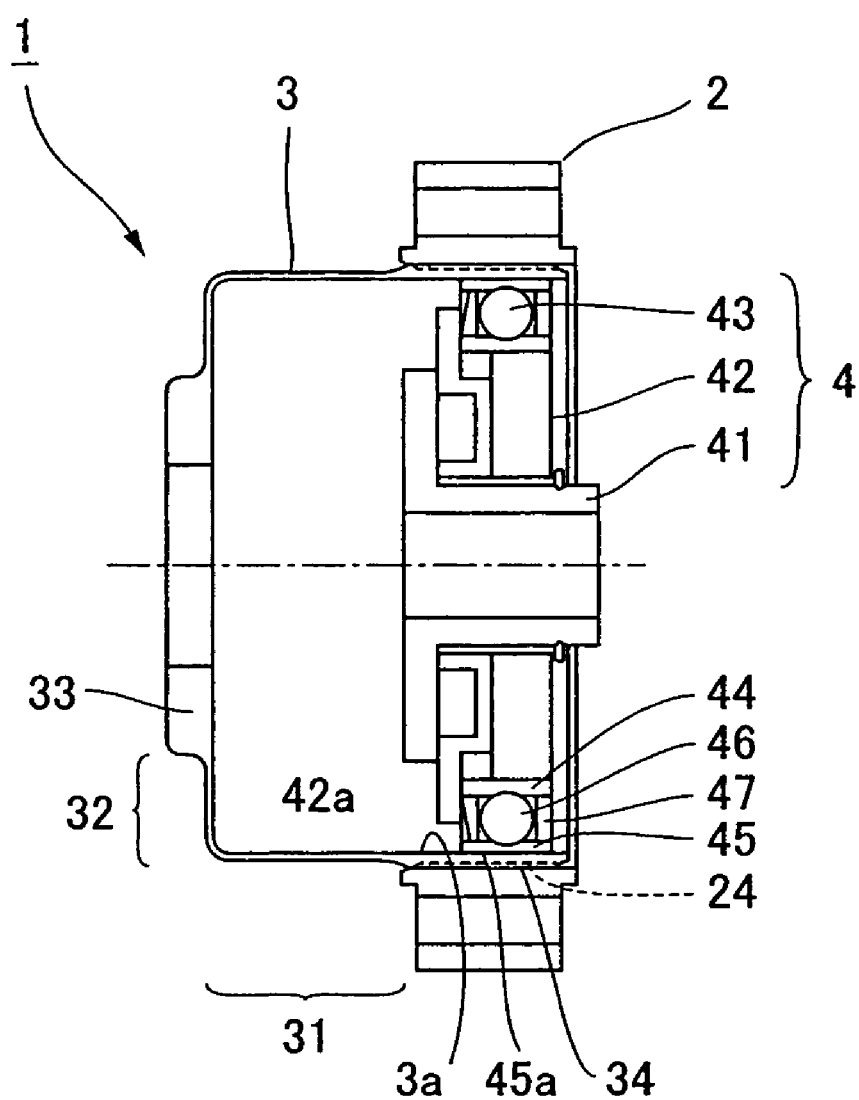
FIG. 1 is a longitudinal sectional view showing an example of a wave gear device in which the present invention has been applied.
Figure 2:
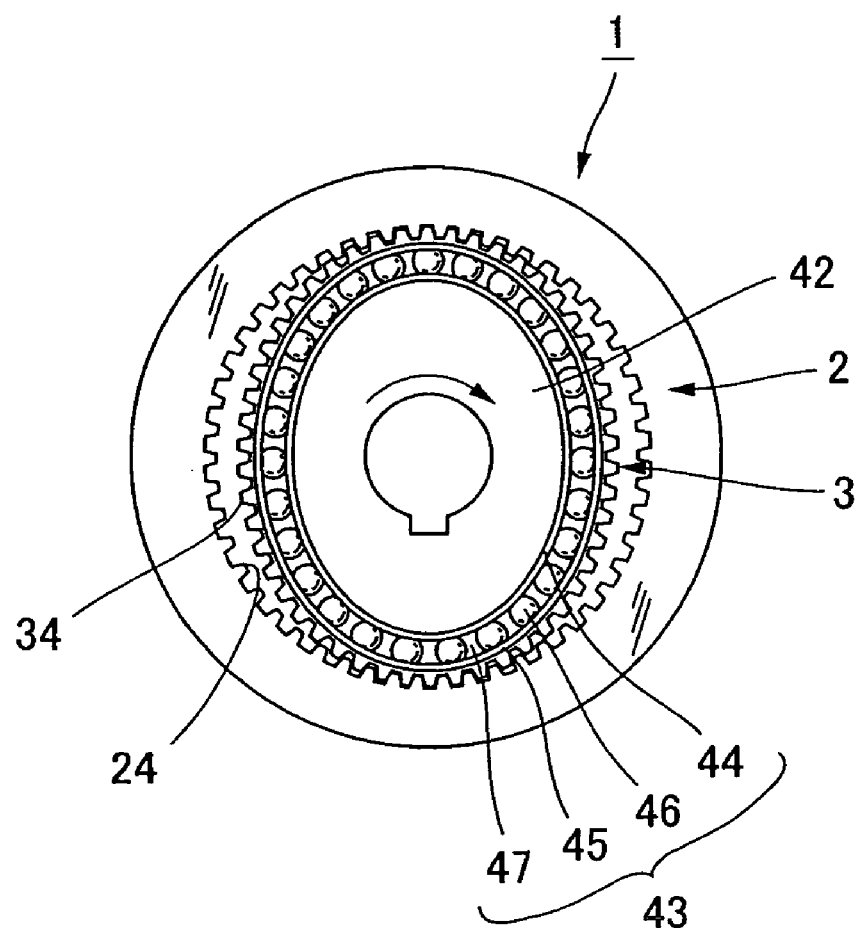
FIG. 2 is a cross-sectional block diagram of the wave gear device of FIG. 1.

FIG. 1 is a longitudinal sectional view showing a wave gear device. FIG. 2 is a cross-sectional block diagram of the device sectioned along the surface orthogonal to the axis. The wave gear device 1 is a so-called "cup-shaped wave gear device." A cup-shaped flexible external gear 3 is coaxially disposed inside an annular rigid internal gear 2, and an elliptically contoured wave generator 4 is coaxially mounted therein. The cup-shaped flexible external gear 3 comprises a cylindrical shell portion 31, an annular diaphragm 32 in which one end in the axial direction is sealed, and an annular boss 33 formed in a continuous fashion on the internal peripheral edge of the diaphragm 32. External teeth 34 are formed on the external peripheral portion of the other end portion of the cylindrical shell portion 31, and the external teeth 34 face the internal teeth 24 of the rigid internal gear 2 and can mesh with the internal teeth 24.

The elliptically contoured wave generator 4 comprises a hollow input shaft 41, an elliptically contoured rigid plug 42 coaxially fixed to the external periphery, and a wave bearing 43 mounted on the external periphery of the rigid plug 42. The wave bearing 43 comprises a thin flexible inner ring 44 and outer ring 45, a plurality of balls 46 rollably inserted therebetween, and a retainer 47 for rollably holding the balls 46 at fixed intervals along the circumferential direction. The wave bearing 43 is configured with the inner ring 44 mounted on the external peripheral surface 42a of the rigid plug 42, and is elliptically flexed overall. The external peripheral surface 45a of the outer ring of the wave bearing 43 is pressed to the internal peripheral surface portion 3a of the external tooth-forming portion of the flexible external gear 3, and the external tooth-forming portion whose initial shape is that of a perfect circle is elliptically flexed. As a result, the external teeth 34 positioned at the two ends of the ellipsis in the direction of the major axis are pressed to the internal teeth 24 of the perfectly circular rigid internal gear 2 and mesh with the internal teeth 24.

The difference in the number of teeth between the external teeth 34 and internal teeth 24 is 2 (ordinarily 2n, where n is a positive integer). When the wave generator 4 rotates and the meshing position of the two gears 2 and 3 moves in the circumferential direction, relative rotation is produced between the two gears because of the tooth number difference of the two gears. When the rigid internal gear 2, for example, is fixed in place so that the gear cannot rotate, the flexible external gear 3 rotates at a rotational speed that has been reduced by a prescribed reduction ratio with respect to the rotational speed of the wave generator 4.

FIGS. 3A to 3D are schematic views showing the structure and operation of the retainer 47 of the wave bearing 43. The retainer 47 of the wave bearing 43 of this example functions as a restraining member for restraining the wave bearing 43 so that the wave bearing integrally rotates with the rigid plug 42. For this reason, the retainer 47 comprises a pair of left and right elastic rings 5 and 5 that are elastically deformable in the circumferential and radial directions, rigid partition pieces 7 extended between the rings at fixed intervals along the circumferential direction, and split side plate pieces 8 fixed to the left and right elastic rings 5 and 5 in positions between the partition pieces 7. The two side surfaces in the circumferential direction of the partition pieces 7 are curved surfaces 7a and 7b, and the areas between the partition pieces 7 are pockets for rollably holding the balls 46.

In this case, the split side plate pieces 8 are composite members comprising a main body member 81 and a friction contact member 82 that is laminated and fixed to the end face of the main body member 81 on the side of the outer ring, and the end face of the friction contact member 82 on the side of the outer ring is a frictional contact surface 82a whose shape is contoured to correspond to the internal peripheral surface 45b of the outer ring.

The operation of the wave gear device 1 of this configuration is described next. When the wave generator 4 is rotating at a low speed, the wave bearing 43 functions to keep the wave generator 4 and the flexible external gear 3 in a state in which the generator and the gear can rotate relative to each other. When the rotational speed of the wave generator 4 increases, the centrifugal force exerted on the split side plate pieces 8 and the partition pieces 7 mounted on the elastic rings 5 also increases in association the increased speed. As a result, the partition pieces 7 and split side plate pieces 8 are gradually displaced outwardly (toward the outer ring) in the radial direction.

Figure 3A:
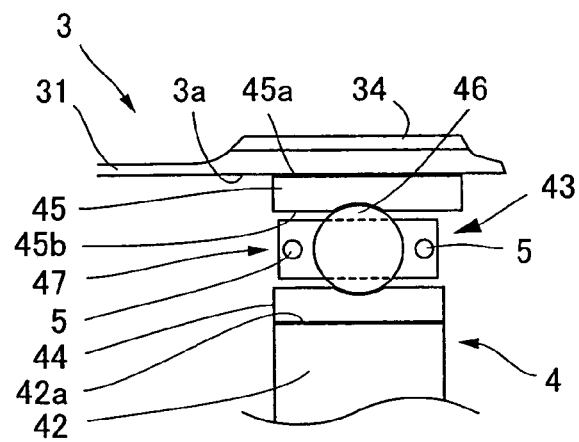
FIGS. 3A to 3D are schematic views showing the structure and operation of the retainer of the wave bearing in the wave gear device of FIG. 1.
Figure 3B:
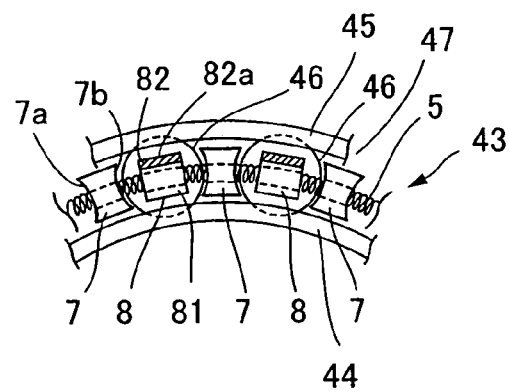
Figure 3C:
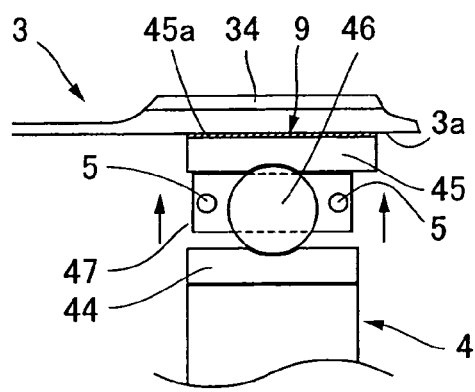
Figure 3D:
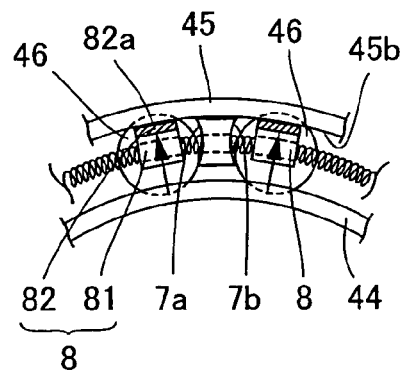

When the partition pieces 7 are outwardly displaced, the portions of the curved surfaces 7a and 7b that face the inner ring and are disposed on both sides of each piece make contact with the external peripheral portions of the left and right balls 46 on the side of the inner ring, as shown in FIGS. 3C and 3D. The rolling of the balls 46 begins to be restrained by the frictional contact resistance produced by the contact surfaces. Also, the frictional contact surface 82a of the split side plate pieces 8 on the side of the outer ring makes contact with the internal peripheral surface 45b of the outer ring. The frictional contact resistance produced on these contact surfaces begins to restrain the rotation of the retainer 47.

An increase in the rotational speed of the wave generator 4 causes the relative sliding rotational speed between the flexible external gear 3 and the wave generator 4 to increase as well. Lubrication oil is fed from a lubrication oil supply mechanism (not shown) inside the wave gear device 1, and a lubrication oil film 9 begins to be formed between the flexible external gear and wave generator. As a result, the sliding frictional resistance between the flexible external gear 3 and wave generator 4 begins to decrease. In other words, the sliding frictional resistance is reduced by the lubrication oil film 9 formed between the internal peripheral surface portion 3a of the external teeth-forming portion of the flexible external gear 3 and the external peripheral surface 45a of the outer ring of the wave bearing 43.

When the fast-rotating wave generator 4 reaches a prescribed rotational speed (first rotational speed) or greater, frictional contact resistance produced by the centrifugal force exerted on the partition pieces 7 and split side plate pieces 8 becomes greater than the sliding frictional resistance generated between the flexible external gear 3 and the external peripheral surface 45a of the outer ring of the wave bearing. As a result, the balls 46, retainer 47, and outer ring 45 are restrained so as to rotate integrally with respect to the inner ring 44 that is fixed to the external peripheral surface 42a of the rigid plug 42, and the balls 46 cannot rotate or revolve any longer. Hence, the area between the wave generator 4 and flexible external gear 3 switches completely from the rolling bearing state of the wave bearing 43 to the sliding bearing state of the lubrication oil film formed between the wave generator and flexible external gear.

When the rotational speed of the wave generator 4 drops below a prescribed rotational speed (first rotational speed), the frictional contact resistance produced by the split side plate pieces 8 and the partition pieces 7 of the retainer 47 becomes less than the sliding frictional resistance between the flexible external gear 3 and wave generator 4. As a result, the sliding bearing state of the lubrication oil film and the rolling bearing state of the wave bearing 43 shifts to a state in which the two states occur simultaneously. The partition pieces 7 and split side plate pieces 8 gradually return inward in the radial direction due to the elastic return force of the elastic rings 5 of the retainer 47 in conjunction with the reduction in the rotational speed of the wave generator 4. Thus, when the rotational speed of the wave generator 4 falls below a prescribed rotational speed (second rotational speed) that is less than the first rotational speed, the wave generator shifts to the rolling bearing state of the wave bearing 43, as shown in FIGS. 3A and 3B.

Thus, in a bearing mechanism in which the wave generator 4 and flexible external gear 3 in the wave gear device 1 of the present example are held in place while allowed to rotate relative to each other, the rolling bearing state of the wave bearing 43 is brought about when the wave generator 4 is rotating at a low rotational speed that is equal to or less than the second rotational speed. In the interval between the second rotational speed and the first rotational speed, the wave generator 4 is in a dual state, i.e., the rolling bearing state of the wave bearing 43 and the sliding bearing state of the lubrication oil film formed between the wave generator and flexible external gear. When the wave generator 4 furthermore reaches high-speed rotation that is equal to or greater than the first rotational speed, the wave generator shifts completely from the rolling bearing state of the wave bearing 43 to the sliding bearing state of the lubrication oil film.

In the wave gear device 1 of the present example, therefore, the rotation of the wave bearing 43 is therefore restrained at high rotational speeds, and the balls 46 cannot revolve or rotate any longer. The balls 46, outer ring 45, and other components are thereby prevented from developing rolling fatigue due to high-speed rotation. As a result, a wave gear device that is capable of higher-speed rotational input in comparison with conventional wave gear devices can be realized. Since high-speed rotation is made possible, a wave gear device suitable for use as a speed-increasing device can be realized.

(Another Example of the Restraining Member)

Figure 4A:
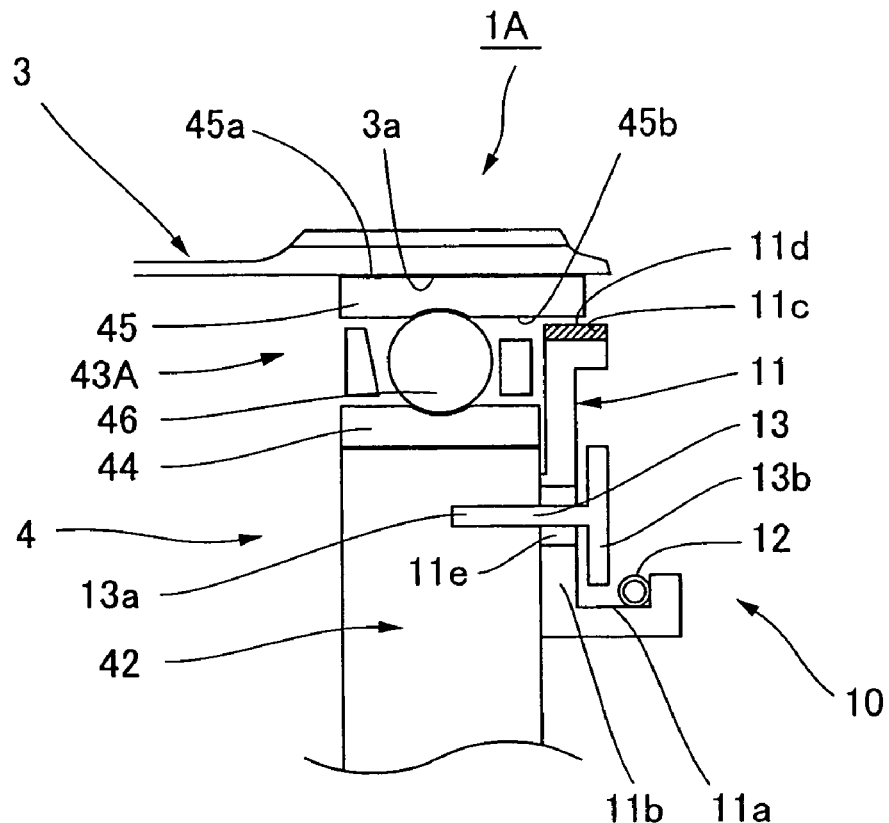
FIGS. 4A and 4B are schematic views showing another example of the restraining member according to the present invention.
Figure 4B:
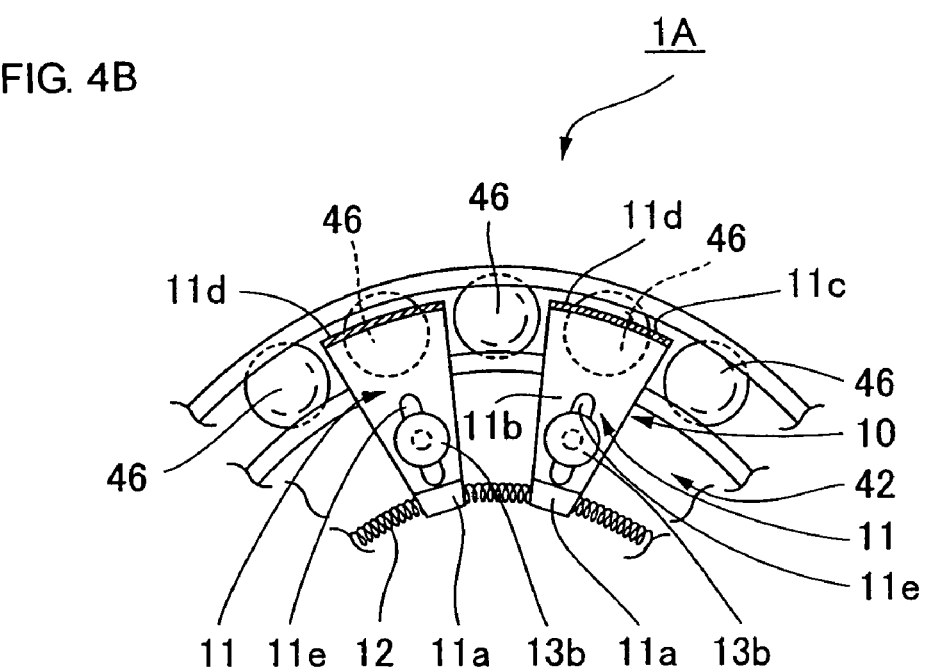

FIGS. 4A and 4B are schematic views showing an example of a restraining member for restraining the wave bearing 43 so that the wave bearing integrally rotates with the rigid plug 42. A commonly used wave bearing 43A is adopted in the wave gear device 1A of the present example. The restraining member 10 for restraining the rotation of the wave bearing 43A comprises a plurality of fan-shaped restraining plates 11 radially mounted on the side surface of the rigid plug 42 of the wave generator 4, and an elastic ring 12 passed over L-shaped hooks 11a that are formed on the internal peripheral ends of the restraining plates 11. The restraining plate 11 is a composite member comprising a main body member 11b and a frictional contact member 11c that is laminated and fixed to the external peripheral surface of the main body member 11b. The frictional contact member 11c is formed from a material having a higher friction coefficient than the main body member 11b. The end face of the outer ring side of the frictional contact member 11c is the frictional contact surface 11d whose shape is contoured to correspond to the internal peripheral surface 45b of the outer ring.

Guide holes 11e that are long in the radial direction are formed in the restraining plates 11, and guide pins 13 are slidably inserted into the guide holes 11e. Leg portions 13a of the guide pins 13 are driven into and fixed to the rigid plug 42, and the head portions 13b have a larger diameter than the width of the guide holes 11e so as to prevent the pins from coming out of the guide holes 11e. The elastic ring 12 is elastically deformable in the circumferential and radial directions.

In the wave gear device 1A provided with a restraining member 10 having this configuration, the wave generator 4 and flexible external gear 3 are held in place by the wave bearing 43A while allowed to rotate relative to each other when the wave generator 4 is rotating at a low speed. When the rotational speed of the wave generator 4 increases to a level that is equal to or greater than a prescribed rotational speed, the frictional contact resistance generated between the frictional contact surface 11d of the restraining plates 11 and the contacting internal peripheral surface 45b of the external ring becomes greater than the sliding frictional resistance between the external peripheral surface 45a of the outer ring of the wave bearing 43A and the internal peripheral surface portion 3a of the flexible external gear 3. As a result, the wave bearing 43A is restrained by the restraining member 10 so as to integrally rotate together with the rigid plug 42, and the bearing mechanism switches from the rolling bearing state of the wave bearing 43A to the sliding bearing state of the lubrication oil film formed between the wave generator 4 and flexible external gear 3. When the wave generator 4 returns to a low rotational speed, the bearing mechanism again returns to the rolling bearing state of the wave bearing 43A.

The same effects of the wave gear device 1 described above can be obtained by a wave gear device 1A provided with the restraining member 10 of the present example.

Ball bearings were used as the wave bearing in the examples described above, but roller bearings or other rolling bearings can also be adopted.

INDUSTRIAL APPLICABILITY

As described above, in the wave gear device of the present invention, the wave generator and flexible external gear are supported by ball bearings or another rolling bearing during low-speed rotation while allowed to rotate relative to each other, and the function of the rolling bearings is stopped during high-speed rotation, whereupon the wave generator and flexible external gear are supported in a relatively rotatable manner by making use of sliding produced by an oil film or a gaseous film formed on the mutual sliding surfaces of the wave generator and flexible external gear during high-speed rotation.

Therefore, the life of the outer ring and rolling elements of the rolling bearings is not reduced in association with high-speed rotation because the rolling bearings do not function during high-speed rotation. Also, the limit on the maximum rotational speed commonly caused by the rolling fatigue of the rolling bearings is eliminated. Hence, in accordance with the present invention, a wave gear device that can handle high-speed rotations can be realized. A wave gear device suitable for use as speed-increasing device can also be produced.

The invention claimed is:

1. A wave gear device, comprising:
   an annular rigid internal gear;
   an annular flexible external gear disposed inside the rigid internal gear;
   a wave generator for flexing the flexible external gear in a radial direction to cause partial meshing with the rigid internal gear, and causing meshing location of the two gears to rotate in a circumferential direction; and
   a bearing mechanism for holding the flexible external gear and the wave generator while allowing the flexible external gear and the generator to rotate relative to each other, wherein
   the bearing mechanism reversibly switches between a rolling bearing state produced by rolling elements, and a sliding bearing state produced by an oil film or another fluid lubrication film, in accordance with a rotational speed of the wave generator.

2. The wave gear device according to claim 1, wherein
   the wave generator comprises a rigid plug and rolling bearings;
   the rolling bearing comprises an inner ring fitted to an external peripheral surface of the rigid plug, an outer ring in contact with an internal peripheral surface of the flexible external gear via the fluid lubrication film, and the rolling elements mounted between the inner ring and outer ring; and
   the bearing mechanism comprises the rolling bearings, the fluid lubrication film, and a restraining member for restraining the rolling bearings so as to integrally rotate together with the rigid plug when the rotational speed of the wave generator reaches a prescribed rotational speed or higher.

3. The wave gear device according to claim 2, wherein
   the rolling bearing is provided with a retainer that functions as the restraining member and that holds the rolling elements; and
   at least a portion of a location of the retainer is displaced outward in a radial direction by centrifugal force exerted on the retainer in association with an increase in the rotational speed of the wave generator, and shifts to a state of contact with the outer ring and/or the rolling elements.

4. The wave gear device according to claim 3, wherein the location of the retainer is displaced inward in the radial direction by an elastic return force, and shifts to a state of separation from the outer ring and/or the rolling elements when the rotational speed of the wave generator decreases.

5. The wave gear device according to claim 1, wherein a surface in frictional contact with the outer ring and/or the rolling elements at the location of the retainer is a high-friction surface having a high friction coefficient in comparison with other portions of the retainer.

6. The wave gear device according to claim 3, wherein frictional contact resistance generated between the retainer and the outer ring and/or the rolling elements becomes greater than frictional contact resistance generated between the external peripheral surface of the outer ring and the internal peripheral surface of the flexible external gear when the wave generator reaches the prescribed rotational speed or higher.

7. The wave gear device according to claim 2, wherein the rolling bearing is a ball bearing.

8. The wave gear device according to claim 2, wherein the restraining member is fixed in a radially moveable state with respect to the rigid plug or the inner ring, moves outward in a radial direction by centrifugal force exerted on the restraining member in association with rotation of the wave generator, and shifts to a state of contact with the outer ring and/or the rolling elements.

9. The wave gear device according to claim 8, wherein the restraining member moves inward in the radial direction by an elastic return force, and shifts to a state of separation from the outer ring and/or the rolling elements when the rotational speed of the wave generator decreases.

10. The wave gear device according to claim 9, wherein a surface in frictional contact with the outer ring and/or the rolling elements in the restraining member is a high-friction surface having a high friction coefficient in comparison with other portions of the restraining member.

11. The wave gear device according to claim 8, wherein frictional contact resistance generated between the restraining member and the outer ring and/or the rolling elements becomes greater than frictional contact resistance generated between an external peripheral surface of the outer ring and an internal peripheral surface of the flexible external gear when the wave generator reaches the prescribed rotational speed or higher.

12. The wave gear device according to claim 8, wherein the rolling bearing is a ball bearing.

\* \* \* \* \*